US011630432B1

(12) United States Patent
Mou et al.

(10) Patent No.: US 11,630,432 B1
(45) Date of Patent: Apr. 18, 2023

(54) TOOTH PATH GENERATION METHOD FOR BIDIRECTIONAL CUTTING EDGE TOOL

(71) Applicant: CHENGDU AIRCRAFT INDUSTRIAL (GROUP) CO., LTD., Sichuan (CN)

(72) Inventors: Wenping Mou, Chengdu (CN); Shaochun Sui, Chengdu (CN); Pengcheng Wang, Chengdu (CN); Xin Shen, Chengdu (CN); Xin Gao, Chengdu (CN); Hongjin Zhang, Chengdu (CN); Xiang Cao, Chengdu (CN); Mingcong Huang, Chengdu (CN)

(73) Assignee: CHENGDU AIRCRAFT INDUSTRIAL (GROUP) CO., LTD., Sichuan (CN)

( * ) Notice: Subject to any disclaimer, the term of this patent is extended or adjusted under 35 U.S.C. 154(b) by 0 days.

(21) Appl. No.: 17/911,727

(22) PCT Filed: Mar. 25, 2020

(86) PCT No.: PCT/CN2020/081109
§ 371 (c)(1),
(2) Date: Sep. 15, 2022

(87) PCT Pub. No.: WO2021/189296
PCT Pub. Date: Sep. 30, 2021

(51) Int. Cl.
*G05B 19/19* (2006.01)
*G05B 19/18* (2006.01)

(52) U.S. Cl.
CPC ........... *G05B 19/19* (2013.01); *G05B 19/182* (2013.01); *G05B 2219/35097* (2013.01)

(58) Field of Classification Search
CPC ................. G05B 19/19; G05B 19/182; G05B 2219/35097
See application file for complete search history.

(56) References Cited

U.S. PATENT DOCUMENTS 4,445,182 A * 4/1984 Morita ............. G05B 19/40932
700/181
7,822,502 B2 10/2010 Utsumi et al.
(Continued)

FOREIGN PATENT DOCUMENTS

CN 102601432 A 7/2012
CN 106903357 A 6/2017
(Continued)

OTHER PUBLICATIONS

Zhang, Wei-Hong, et al. "A new algorithm for the numerical simulation of machined surface topography in multiaxis ball-end milling." Journal of Manufacturing Science and Engineering 130.1 (2008). (Year: 2008).*

(Continued)

*Primary Examiner* — Michael D Masinick
(74) *Attorney, Agent, or Firm* — Michael J. Feigin, Esq.; Feigin and Fridman LLC

(57) ABSTRACT

A tool path generation method for a bidirectional cutting edge tool, comprising: first obtaining a driving line and an auxiliary driving line of a contour, and discretizing the driving line to obtain tool position driving points; obtaining a tool axis vector according to a rule plane of the driving points and the auxiliary driving line; and then, calculating a tool position point according to geometric dimensions of the tool so as to obtain a tool path of a machining contour of the bidirectional cutting edge tool. The problems of fiber delamination and fluffing, burr generation, and the like of the contour of a machined part can be avoided, and the machining quality of a contour surface is improved, and the low-cost machining of parts can be efficiently achieved.

3 Claims, 2 Drawing Sheets

(56) References Cited

U.S. PATENT DOCUMENTS

| | | | | |
|---|---|---|---|---|
| 2005/0113963 | A1* | 5/2005 | Cho | G05B 19/19 700/188 |
| 2012/0221140 | A1* | 8/2012 | Berman | G05B 19/041 83/13 |
| 2013/0345853 | A1* | 12/2013 | Berman | G05B 19/18 700/186 |
| 2015/0362914 | A1* | 12/2015 | DeSimone | B24C 3/00 700/118 |
| 2022/0355387 | A1* | 11/2022 | Guo | B23B 5/36 |

FOREIGN PATENT DOCUMENTS

| | | | | |
|---|---|---|---|---|
| CN | 109725593 | A | | 5/2019 |
| CN | 110888394 | A | | 3/2020 |
| CN | 111506017 | A | * | 8/2020 ......... G05B 19/4099 |

OTHER PUBLICATIONS

Liu, Xianli, et al. "Wear distribution characteristics of carbide ball end milling tool focusing on tool path and posture." Wear 498 (2022): 204248. (Year: 2022).*

* cited by examiner

TOOTH PATH GENERATION METHOD FOR BIDIRECTIONAL CUTTING EDGE TOOL

TECHNICAL FIELD

The invention relates to the field of numerical control machining, and in particular to a tool path generation method for a bidirectional cutting edge tool.

BACKGROUND ART

With the development of the aviation equipment technology, the amount of composite materials used in aviation equipment has increased significantly, and especially a part, such as a carbon fiber skin, has been widely used, which plays a vital role in improving the performance of the aviation equipment.

The inventor found in studies that a contour of a part, such as a carbon fiber skin, is required to be precisely milled during production and machining, and the contour is mainly milled at a high speed during the milling. Due to the properties of the material, the existing traditional tools with diamond-shaped teeth are seriously worn, which causes the problems, such as fiber delamination, fluffing, burr generation, and the like of the part in the contour milling process extremely easily, thus seriously influencing the machining quality and delivery period of the part. In addition, because of the significant difference between the bidirectional cutting edge tool and the traditional tool in terms of structure, it is difficult to program the bidirectional cutting edge tool and to realize the precise control of the tool path.

The bidirectional cutting edge tool has not been widely used at present because of the difficulty in programming. The current common practices to reduce the problems of delamination and fluffing, burr generation, and the like during the milling of the contour of carbon fiber consist in that:

on the one hand, relatively conservative cutting parameters are used, which will seriously influence the machining efficiency of the part; and on the other hand, a new tool is replaced for frequently, which will in turn greatly increase the manufacturing cost of the part, resulting in the current situation of low efficiency and high cost in machining the carbon fiber skin part.

SUMMARY OF THE INVENTION

The invention aims to provide a tool path generation method for a bidirectional cutting edge tool in order to solve the problems of low quality and efficiency and high cost of machining of existing parts, such as a carbon fiber skin.

Embodiments of the invention are realized as follows:

a tool path generation method for a bidirectional cutting edge tool, the bidirectional cutting edge tool having a second edge and a first edge which are axially connected and have opposite running directions for cutting, the rail generation method comprising:

step 1: creating a part contour machining coordinate system, and acquiring contour feature information of a part and tool geometry information, wherein the contour feature information of the part comprises a feature surface and a part thickness, and the tool geometry information comprises the diameter of the tool, the length of the second edge and the length of the first edge;

step 2: considering upper and lower side lines of the feature surface of the part as contour side lines, and determining a contour side line having a longer length as a driving line and a contour side line having a shorter length as an auxiliary driving line based on the lengths of the contour side lines;

step 3: extending both ends of the driving line in a G1 continuous manner, with an extended length being larger than the radius of the tool to ensure that a starting position of the tool path is located outside the contour, while extending the auxiliary driving line in the G1 continuous manner to ensure that a rule plane created by two end points of the driving line intersects with the auxiliary driving line;

step 4: discretizing the driving line to obtain a plurality of driving points for contour machining, and creating the rule plane of the driving line at each driving point;

step 5: setting a point obtained by the intersection of the rule plane at each driving point and the auxiliary driving line as a tool axis control point, a vector between each driving point to its respective tool axis control point being a tool axis vector $r(i_r, j_r, k_r)$ at a current driving point, wherein in the current machining coordinate system, if a Z-direction value $Z_q$ of the driving point is less than a Z-direction value $Z_k$ of the tool axis control point, the tool axis vector is $r(i_r, j_r, k_r)$, otherwise the tool axis vector is $-r(i_r, j_r, k_r)$;

step 6: calculating an actual tool position point of the bidirectional cutting edge tool by: taking the driving point as $P_i(x_i, y_i, z_i)$, the diameter of the tool as D, the thickness of the part as H, the Z-direction value of the driving point as $Z_q$, the Z-direction value of the control point as $Z_k$, the length of the second edge of an outer section of the tool as $L_b$, an actual tool position point as $P(x, y, z)$, a tool axis unit vector as $r(i_r, j_r, k_r)$, and an unit vector in a tool advancing direction as $v(i_v, j_v, k_v)$, and the following formula being satisfied:

$$\begin{cases} P(x, y, z) = P_i(x_i, y_i, z_i) - (L_b + H/2)\vec{r} + D/2(\vec{v} \times \vec{r}), Z_q \dot{\iota} Z_k \\ P(x, y, z) = P_i(x_i, y_i, z_i) - (L_b - H/2)\vec{r} + D/2(\vec{v} \times \vec{r}), Z_q \dot{\iota} Z_k \end{cases}$$

and step 7: repeating step 5 and step 6 to calculate the actual tool position point and the tool axis vector corresponding to each driving point until the calculation of all the actual tool position points and tool axis vectors is completed, so as to form a complete contour machining path of the bidirectional cutting edge tool.

The tool path generation method of the present disclosure avoids the situation where only one side edge of the tool cuts materials by accurately controlling the position of the tool and the tool axis vector, such that the cutting edges having different running directions in the tool path both cut the materials and a cutting force is always oriented towards the centre of the contour, which can eliminate the problems of fiber delamination and fluffing, burr generation, and the like of the contour of the machined part and improve the machining quality of a contour surface. The low-cost machining of the part can be efficiently achieved by means of the tool path generation method determined by the above method.

In an embodiment, an object to be machined by the tool path generation method is a contour feature of a carbon fiber skin material, and the tool advancing direction is parallel to a fiber extension direction.

In an embodiment, a boundary between the second edge and the first edge is located at a middle position on the feature surface of the contour feature in a thickness direction.

BRIEF DESCRIPTION OF THE DRAWINGS

In order to explain the technical solutions of the embodiments of the present invention more clearly, the accompa

Reference signs: 1—first edge, 2—second edge; 3—driving line, 4—auxiliary driving line.

DETAILED DESCRIPTION OF EMBODIMENTS

In order to make the purposes, the technical solutions and the advantages of the embodiments of the present invention clearer, the technical solutions in the embodiments of the present invention will be clearly and completely described below with reference to the accompanying drawings in the embodiments of the present invention. Apparently, the embodiments described are some rather than all of the embodiments of the present invention. The assemblies of the embodiments of the present invention generally described and shown in the accompanying drawings herein can be arranged and designed in various configurations.

Therefore, the following detailed description of the embodiments of the present invention provided in the accompanying drawings is not intended to limit the scope of the claimed invention, and only to represent the selected embodiments of the invention. Based on the embodiments of the present invention, all other embodiments obtained by those of ordinary skill in the art without involving any inventive effort shall fall within the scope of protection of the present invention.

It should be noted that the similar numerals and letters denote similar items in the following accompanying drawings, and therefore, once an item is defined in one accompanying drawing, it need not be further defined and explained in subsequent accompanying drawings.

In the description of the present invention, it should be noted that the orientation or position relationship indicated by the terms, such as "centre", "upper", "lower", "left", "right", "vertical", "horizontal", "inside", "outside" and the like, are based on the orientation or position relationship shown in the accompanying drawings, or are the orientation or position relationship of usual placement of the product of the present invention when in use, and are only for facilitating the description of the present invention and simplifying the description, rather than indicating or implying that the device or element referred to must have a particular orientation or be constructed and operated in a particular orientation, and therefore will not be interpreted as limiting the present invention. In addition, the terms "first", "second" and the like appeared in the description of the present invention are only used to distinguish the description, and cannot be construed as indicating or implying relative importance.

In addition, the terms "horizontal", "vertical", and the like appeared in the description of the present invention do not mean that a component is required to be absolutely horizontal or suspended, and may be slightly inclined. For example, "horizontal" only means that the direction is more horizontal than "vertical", and does not mean that the structure must be completely horizontal, and the structure can be slightly inclined.

Embodiments

Figure 4:
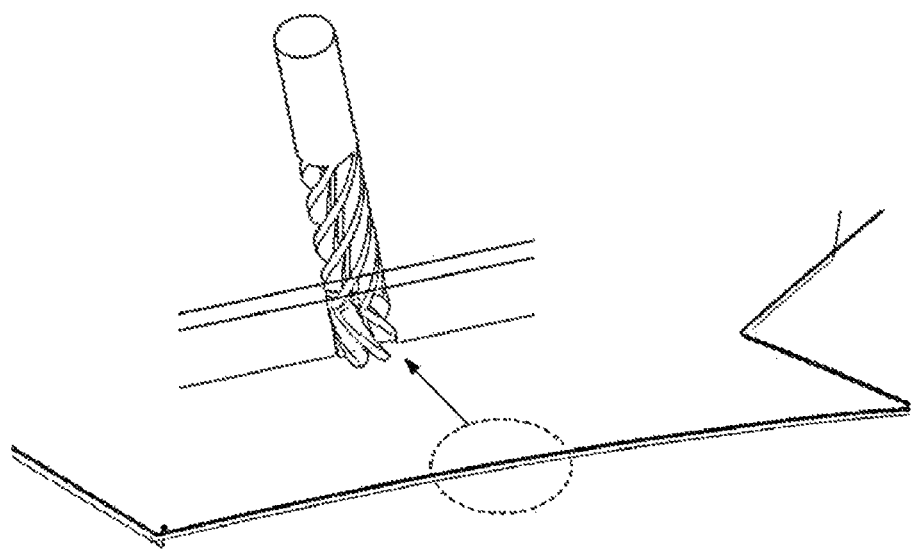
FIG. 4 shows a machining tool path for machining a carbon fiber contour with a bidirectional cutting edge in this embodiment.

In this embodiment, a typical contour feature of carbon fiber skin shown in FIG. 4 is taken as an example to illustrate a tool path generation method for a bidirectional cutting edge tool in this embodiment.

Figure 1:
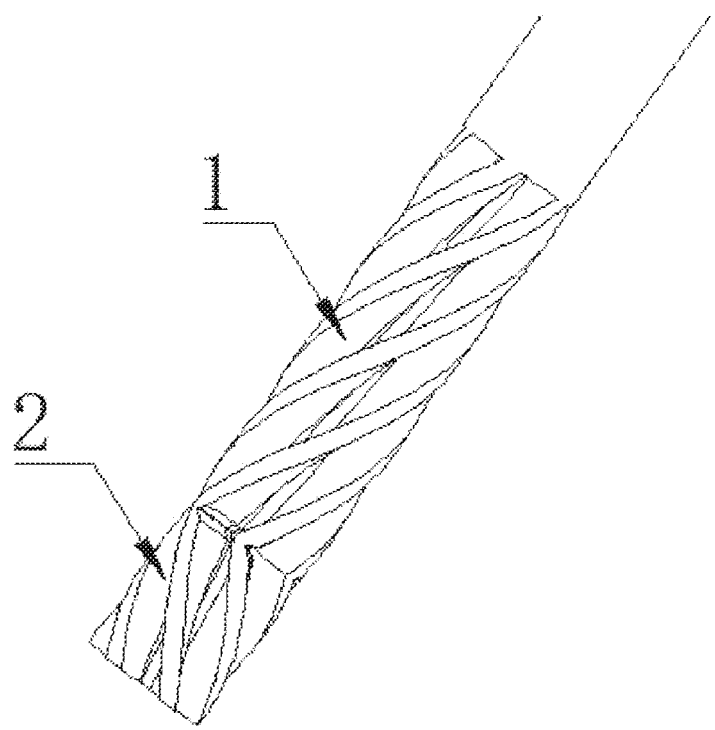
- FIG. 1 shows a structural schematic diagram of a tool in an embodiment of the present invention.

Referring to FIG. 4 cooperatively, an object to be machined of this embodiment is a carbon fiber skin having a thickness of 2.5 mm. Referring to FIG. 1, in this method, a bidirectional cutting edge tool having a diameter of Φ6 mm, a second edge 2 of length $L_b$ of 5 mm, and a first edge 1 of length of 10 mm for machining is selected.

Figure 2:
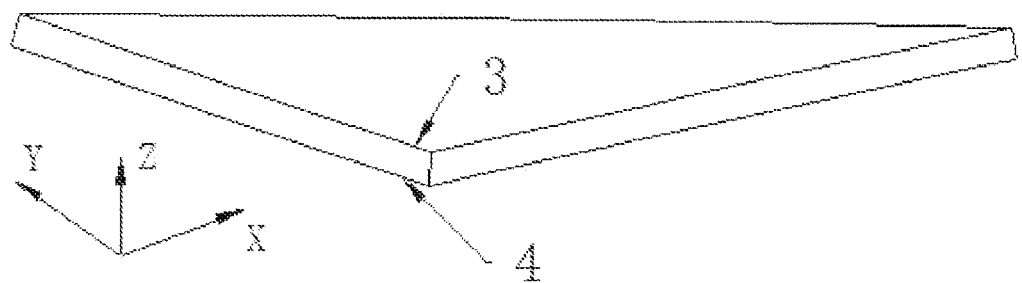
FIG. 2 shows a typical contour feature structure.
Figure 3:
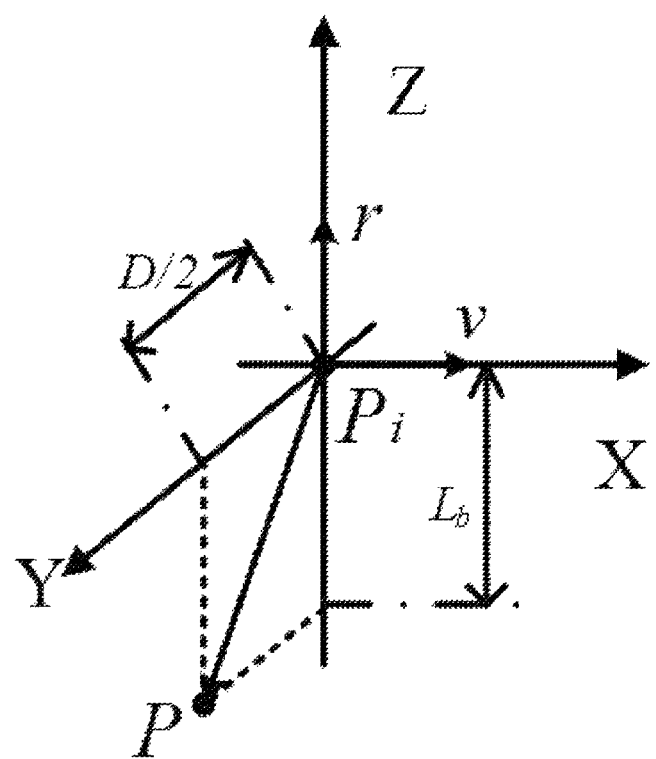
FIG. 3 illustrates a schematic diagram of the calculation of tool position control points.

The rail generation method in this embodiment comprises:

step 1: creating a part contour machining coordinate system XYZ, and acquiring contour feature information of a part and tool geometry information, wherein the contour feature information of the part comprises a feature surface and a part thickness, and the tool geometry information comprises the diameter of the tool, the length of the second edge and the length of the first edge, and wherein the feature surface refers to a contour surface of the part to be machined and formed;

step 2: referring to FIG. 2 cooperatively, considering upper and lower side lines of the feature surface of the part as contour side lines, and determining a contour side line having a longer length and being upper in the Z direction in a current machining state as a driving line 3 and a contour side line having a shorter length and being lower in the Z direction in the current machining state as an auxiliary driving line 4 based on the lengths of the contour side lines;

step 3: according the tool having the diameter of 6 mm, extending both ends of the driving line in a G1 continuous manner, with an extended length being larger than the radius of 3 mm of the tool, for example, an extension dimension is slected to be 5 mm, in order to ensure that a starting position of the tool path is located outside the contour, while extending the auxiliary driving line in the G1 continuous manner to ensure that a rule plane created by two end points of the driving line intersects with the auxiliary driving line; wherein both ends of the driving line are extended in a G1 continuous manner to the point where an extension section intersects with the original line and the tangent lines at the intersection point are collinear;

step 4: discretizing the driving line to obtain a plurality of driving points for contour machining, and creating the rule plane of the driving line at each driving point, wherein the rule plane at a certain driving point on the driving line refers to a plane passing through the driving point and perpendicular to a tangent line of the driving line at the driving point;

step 5: setting a point obtained by the intersection of the rule plane at each driving point and the auxiliary driving line as a tool axis control point, and obtaining a tool axis vector $r(i_r, j_r, k_r)$ at a current driving point by means of a vector between each driving point to its respective tool axis control point;

step 6: referring to FIG. 3 cooperatively, calculating an actual tool position point of the bidirectional cutting edge tool by:

in the current machining coordinate system XYZ, taking a certain driving point as $P_i$(1091.9217, −617.4748, −107.8676), taking the tool axis control point obtained according to step 5 as $P_k$(1092.3157, −616.2497, −110.0109), and knowing that the Z-direction value of the driving point $Z_q$ is greater than the Z-direction value $Z_k$ of the tool axis control point, the tool diameter being D=6 mm, the part thickness being H=5 mm, taking the actual tool position point as P(x, y, z), taking a tool axis unit vector as r(−0.1576, −0.4901, 0.8573), and taking an unit vector in the tool advancing direction as v(0.9851, −0.1387, 0.1018), the actual tool position point P(1092.6997, −616.9938, −114.7397) being calculated according to the following formula:

$$\begin{cases} P(x, y, z) = P_i(x_i, y_i, z_i) - (L_b + H/2)\vec{r} + D/2(\vec{v}\times\vec{r}), Z_q \mathrel{\iota} Z_k \\ P(x, y, z) = P_i(x_i, y_i, z_i) - (L_b - H/2)\vec{r} + D/2(\vec{v}\times\vec{r}), Z_q \mathrel{\iota} Z_k \end{cases};$$

and step 7: repeating step 5 and step 6 to calculate the actual tool position point and the tool axis vector corresponding to each driving point until the calculation of all the actual tool position points and tool axis vectors is completed, so as to form a complete contour machining path of the bidirectional cutting edge tool.

The foregoing is merely the preferred embodiments of the present invention and is not intended to limit the present invention, and various changes and modifications to the present invention are possible to those skilled in the art. Any modification, equivalent substitution, improvement, and the like made within the spirit and principles of the present invention should fall within the scope of protection of the present invention.

The invention claimed is:

1. A tool path generation method for a bidirectional cutting edge tool, the bidirectional cutting edge tool having a second edge and a first edge which are axially connected and have opposite running directions for cutting, characterized in that the rail generation method comprises:
    step 1: creating a part contour machining coordinate system, and acquiring contour feature information of a part and tool geometry information, wherein the contour feature information of the part comprises a feature surface and a part thickness, and the tool geometry information comprises the diameter of the tool, the length of the second edge and the length of the first edge;
    step 2: considering upper and lower side lines of the feature surface of the part as contour side lines, and determining a contour side line having a longer length as a driving line and a contour side line having a shorter length as an auxiliary driving line based on the lengths of the contour side lines;
    step 3: extending both ends of the driving line in a G1 continuous manner, with an extended length being larger than the radius of the tool to ensure that a starting position of the tool path is located outside the contour, while extending the auxiliary driving line in the G1 continuous manner to ensure that a rule plane created by two end points of the driving line intersects with the auxiliary driving line;
    step 4: discretizing the driving line to obtain a plurality of driving points for contour machining, and creating the rule plane of the driving line at each driving point;
    step 5: setting a point obtained by the intersection of the rule plane at each driving point and the auxiliary driving line as a tool axis control point, a vector between each driving point to its respective tool axis control point being a tool axis vector $r(i_r, j_r, k_r)$ at a current driving point, wherein in the current machining coordinate system, if a Z-direction value $Z_q$ of the driving point is less than a Z-direction value $Z_k$ of the tool axis control point, the tool axis vector is $r(i_r, j_r, k_r)$, otherwise the tool axis vector is $-r(i_r, j_r, k_r)$;
    step 6: calculating an actual tool position point of the bidirectional cutting edge tool by:
    taking the driving point as $P_i(x_i, y_i, z_i)$, the diameter of the tool as D, the thickness of the part as H, the Z-direction value of the driving point as $Z_q$, the Z-direction value of the control point as $Z_k$, the length of the second edge of an outer section of the tool as $L_b$, an actual tool position point as P(x, y, z), a tool axis unit vector as $r(i_r, j_r, k_r)$, and an unit vector in a tool advancing direction as $v(i_v, j_v, k_v)$, calculating the actual tool position point P(x, y, z) at the driving point by the following formula:

$$\begin{cases} P(x, y, z) = P_i(x_i, y_i, z_i) - (L_b + H/2)\vec{r} + D/2(\vec{v}\times\vec{r}), Z_q \mathrel{\iota} Z_k \\ P(x, y, z) = P_i(x_i, y_i, z_i) - (L_b - H/2)\vec{r} + D/2(\vec{v}\times\vec{r}), Z_q \mathrel{\iota} Z_k \end{cases}$$

and step 7: repeating step 5 and step 6 to calculate the actual tool position point and the tool axis vector corresponding to each driving point until the calculation of all the actual tool position points and tool axis vectors is completed, so as to form a complete contour machining path of the bidirectional cutting edge tool.

2. The tool path generation method for the bidirectional cutting edge tool according to claim 1, characterized in that an object to be machined by the tool path generation method is a contour feature of a carbon fiber skin material, and the tool advancing direction is parallel to a fiber extension direction.

3. The tool path generation method for the bidirectional cutting edge tool according to claim 1, characterized in that a boundary between the second edge and the first edge is located at a middle position on the feature surface of the contour feature in a thickness direction.

* * * * *